US006993935B2

(12) United States Patent
Leidy et al.

(10) Patent No.: US 6,993,935 B2
(45) Date of Patent: Feb. 7, 2006

(54) METHOD FOR BLOWING AND REMOVING GLASS CONTAINERS

(75) Inventors: D. Wayne Leidy, Perrysburg, OH (US); Frank J. DiFrank, Toledo, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 0 days.

(21) Appl. No.: 11/036,265

(22) Filed: Jan. 14, 2005

(65) Prior Publication Data
US 2005/0120750 A1    Jun. 9, 2005

Related U.S. Application Data

(62) Division of application No. 10/161,966, filed on Jun. 3, 2002, now Pat. No. 6,848,273.

(51) Int. Cl.
*C03B 9/447*    (2006.01)

(52) U.S. Cl. .................................. 65/68; 65/82; 65/260

(58) Field of Classification Search .......... 65/260–261, 65/227, 239, 68, 82, 84, 85, 86, 241
See application file for complete search history.

(56) References Cited

U.S. PATENT DOCUMENTS

| | | | | |
|---|---|---|---|---|
| 3,107,161 A | * | 10/1963 | Bivens et al. ................... | 65/65 |
| 3,175,702 A | * | 3/1965 | Banyas ....................... | 414/733 |
| 3,472,639 A | | 10/1969 | Mumford | |
| 3,630,709 A | | 12/1971 | Irwin | |
| 4,058,388 A | * | 11/1977 | Zappia ........................ | 65/229 |
| 4,244,725 A | * | 1/1981 | Fenton ........................ | 65/260 |
| 4,427,431 A | | 1/1984 | Mumford et al. | |
| 4,608,072 A | * | 8/1986 | Fenton .......................... | 65/79 |
| 4,892,183 A | * | 1/1990 | Fenton .................... | 198/468.3 |
| 5,271,757 A | * | 12/1993 | Houben et al. ................ | 65/239 |
| 5,346,525 A | * | 9/1994 | Vajda et al. .................. | 65/260 |
| 5,429,651 A | * | 7/1995 | Bolin ........................... | 65/241 |
| 5,587,000 A | * | 12/1996 | Mann et al. .................. | 65/260 |
| 5,807,419 A | | 9/1998 | Rodriguez-Wong et al. | |
| 5,814,119 A | * | 9/1998 | Jones et al. .................... | 65/235 |
| 5,893,942 A | | 4/1999 | Nickey et al. | |
| 5,895,513 A | * | 4/1999 | Ciriello et al. ................ | 65/159 |
| 6,098,427 A | | 8/2000 | Kirkman | |
| 6,241,448 B1 | | 6/2001 | Nicholas | |
| 6,367,287 B1 | * | 4/2002 | Leidy et al. ................... | 65/160 |
| 6,520,319 B2 | * | 2/2003 | Borsarelli et al. ..... | 198/750.11 |
| 6,854,292 B2 | * | 2/2005 | Pinkerton ..................... | 65/159 |
| 6,865,910 B2 | * | 3/2005 | Fenton ......................... | 65/348 |

* cited by examiner

*Primary Examiner*—Steven P. Griffin
*Assistant Examiner*—Carlos Lopez

(57) ABSTRACT

Vertically aligned first (30) and second (32) combined blowhead and takeout mechanisms are provided to sequentially blow glass parisons (P) into containers (C) in a mold set (22) and to transfer blown containers to a deadplate (40) of a glass containing forming machine (20). Each of the combined mechanisms is pivotally suspended about an axis A from a carrier arm (36) that is pivotally attached to an end of an oscillating arm (38), an opposed end of which is pivoted about an axis (B). The axis (B) of each combined blowhead and takeout mechanism is periodically raised and lowered to permit the other combined blowhead and takeout mechanism to oscillate therebeneath, to thereby permit overlapping cycles between the blowhead and takeout mechanisms. Each blowhead and takeout mechanism is provided with a chuck or tong assembly (54) to engage or release each container by its finish (F). Each tong assembly has a plurality of tong elements (74) that are simultaneously moved radially in or out by oscillation of a cam (50) that has a non-circular slot (78) in which a pin (76) carried by each tong element rides.

3 Claims, 12 Drawing Sheets

METHOD FOR BLOWING AND REMOVING GLASS CONTAINERS

This patent application is a divisional of patent application Ser. No. 10/161,966 filed Jun. 3, 2002, now U.S. Pat. 6,848,273.

FIELD OF THE INVENTION

This invention relates to a method of and an apparatus for blowing glass containers in molds of a glass container forming machine and for removing blown containers from such molds. More particularly, this invention relates to a method of and an apparatus for blowing glass containers in blow molds of an I.S. (individual section) glass container forming machine, and for thereafter removing blown containers from such molds and transferring the blown containers to a deadplate of the machine for cooling and eventual removal for further processing.

BACKGROUND OF THE INVENTION

U.S. Pat. No. 3,472,639 (Mumford) and U.S. Pat. No. 4,427,431 (Mumford et al.), which were assigned to a predecessor of the assignee of this application, the disclosure of each of which is incorporated by reference herein, generally describe the manufacture of glass containers by a machine type that is known as an I.S. machine. As taught by such references or as is otherwise known, an I.S. machine has a plurality of side-by-side sections, usually six, eight, ten or even twelve sections, and containers are formed in each section in a two step process. In the first step, one or more, and often three or four, container preforms, which are often called parisons or blanks, are formed by blowing or pressing. The preforms, which are formed in an inverted orientation, that is, with their open ends down, have body portions that are formed in split molds, often called blank molds. Threaded or otherwise suitable configured closure-receiving finish portions of such preforms are formed in separate molds, usually referred to as neck molds or neck rings, which are positioned adjacent to the split blank molds during the molding of parisons therein.

After the conclusion of the parison molding step, the split molds open and the parisons, which are then gripped by the neck molds, are transferred by inverting them through an arc of 180° to split blow molds for blowing of the parisons into containers. The inverting step is performed by turning an invert shaft, to which neck mold-carrying arms are slideably affixed, and results in the parisons being upright during blow molding, that is with their open ends up. The transferring of glass container parisons or blanks from blank molds to blow molds of a I.S. machine, as generally described above, is generally described in commonly-assigned U.S. Pat. No. 5,893,942 (Nickey et al.) and U.S. Pat. No. 6,098,427 (Kirkman), the disclosure of each of which is also incorporated by reference herein.

Conventionally, as is explained, for example, in U.S. Pat. No. 3,630,709 (Irwin), which was assigned to a predecessor of the assignee of this application, the disclosure of which is also incorporated by reference herein, containers are blown in blow molds of an I.S. machine by a blowhead that is moved into blowing engagement with the parisons in the blow molds at a given I.S. machine section, and is then moved out of engagement with blown containers at such blow molds. The blown containers are then removed from the blow molds, after the split molds are opened, by a takeout mechanism that is equipped with a plurality of tongs, one set of tongs for each blow mold at the section of the I.S. machine with which the takeout mechanism is associated. Commonly-assigned U.S. Pat. No. 6,241,448 B1 (Nicholas), the disclosure of which is also incorporated by reference herein, describes a takeout mechanism as generally described above for removing blown containers from molds of an I.S. machine section. U.S. Pat. No. 5,807,419 (Rodriquez-Wong et al.) describes an I.S. machine in which the functions of a blowhead and a takeout mechanism are combined in a single mechanism. However, the mechanism of the '419 reference teaches the use of conventional pivoting tongs (elements 72, 73) to engage each container below a bead, called a transfer bead, that is positioned below the threaded or otherwise configured finish of a container, and this requires that the split blow mold be opened before the blown containers can be grasped for removal by the tongs. The requirement that blow molds be opened before the blown container can be grasped by tongs is a machine timing disadvantage for reasons explained in the aforesaid '488 B1 patent.

BRIEF DESCRIPTION OF THE INVENTION

According to the present invention there is provided a combined blowhead/takeout mechanism for an I.S. glass container forming machine, and a method for blowing glass containers in blow molds of such a glass container forming machine and removing blown containers from such molds. The apparatus includes a container finish engaging chuck for each of the containers that are simultaneously formed at a section of the I.S. machine, and each chuck includes a plurality, preferably three, circumferentially spaced-apart elements that move in and out, in unison, to engage a container by its finish. In this way, the container may be engaged by the chuck while the split molds in which the container is being blown remain closed, to thereby permit the container to be removed for transfer to a deadplate of I.S. machine immediately upon the opening of the split molds of the blow machine in which the container was formed. This eliminates the lost cycle time of certain prior art takeout devices, such as that of the aforesaid '419 patent, which require that the split mold be opened before a container with a transfer bead can be engaged by the takeout device.

In a preferred embodiment of the present invention, a pair of combined blowhead/takeout mechanisms is provided at each section of an I.S. machine. The combined mechanisms are timed to operate alternatively so that one combined mechanism can be positioned to blow containers in the blow molds of the machine while the other combined mechanism is positioned, after depositing blown containers on the machine deadplate, to immediately return to the blow molds to begin a repeat of the blow molding cycle. This eliminates lost cycle time that can arise in an I.S. machine with only a single blowhead at each machine section, as the blowing cycle can not begin until the blowhead returns from having deposited blown containers on the machine's deadplate. To avoid collision of the separate combined mechanisms during operation, the pivot axis of the pivoting arm of each combined mechanism is moveable in a vertical plane, so that the incoming combined mechanism can be positioned at an elevation above that reached by the outgoing combined mechanism during its pivoting motion to transfer blown containers from the blow molds to the machine deadplate. The use of a pair of combined blowhead/takeout mechanisms in this manner improves forming cycle time because it ensures that a combined blowhead/takeout mechanism will be positioned at the blow molds when the molds close around parisons that were transferred to the molds without the need to wait for the return of a blowhead from the machine deadplate after depositing previously blown containers thereon.

Accordingly, it is an object of the present invention to provide an improved apparatus and method for blowing containers from parisons of formable glass in blow molds of a glass container forming machine and for transferring blown containers from the blow molds to a different position for further processing. More particularly, it is the object of the present invention to provide an improved method and apparatus of the foregoing character in which the parisons are blown in blow molds of a glass container forming machine of the I.S. type, and are then transferred to a deadplate of the I.S. machine for cooling and eventual further processing.

For a further understanding of the present invention and the objects thereof, attention is directed to the drawing and the following brief description thereof, to the detailed description of the invention and to the appended claims.

DETAILED DESCRIPTION OF THE INVENTION

As is shown schematically in FIGS. 1–6, an I.S. machine section 20, shown fragmentarily, is provided with a set of blow molds 22 in which containers C are blown from blanks or parisons P of a glass composition at a suitable high temperature to be formable by blowing. FIGS. 1–6 show three containers being formed in each set of blow molds, but it is to be understood that the invention is suited for use in I.S. machines that are designed to simultaneously produce as many as four containers at each machine section (a "quad" machine), or even as few as one container at each such section. In any case, as is understood in the art, each set of blow molds 22 is made up of an opposed set of split molds that periodically open and close with respect to each other by counteroscillating or counterrectilinear motions to define, when closed, a cavity for each container C to be formed therein.

Figure 5:
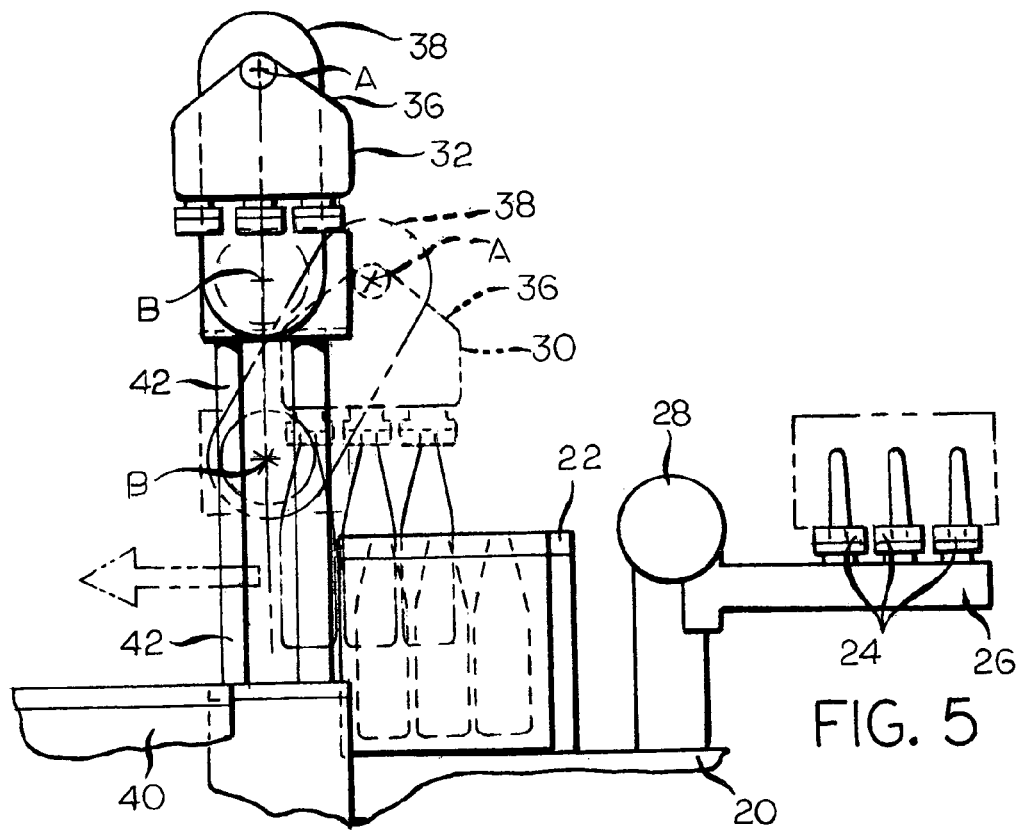
Figure 6:
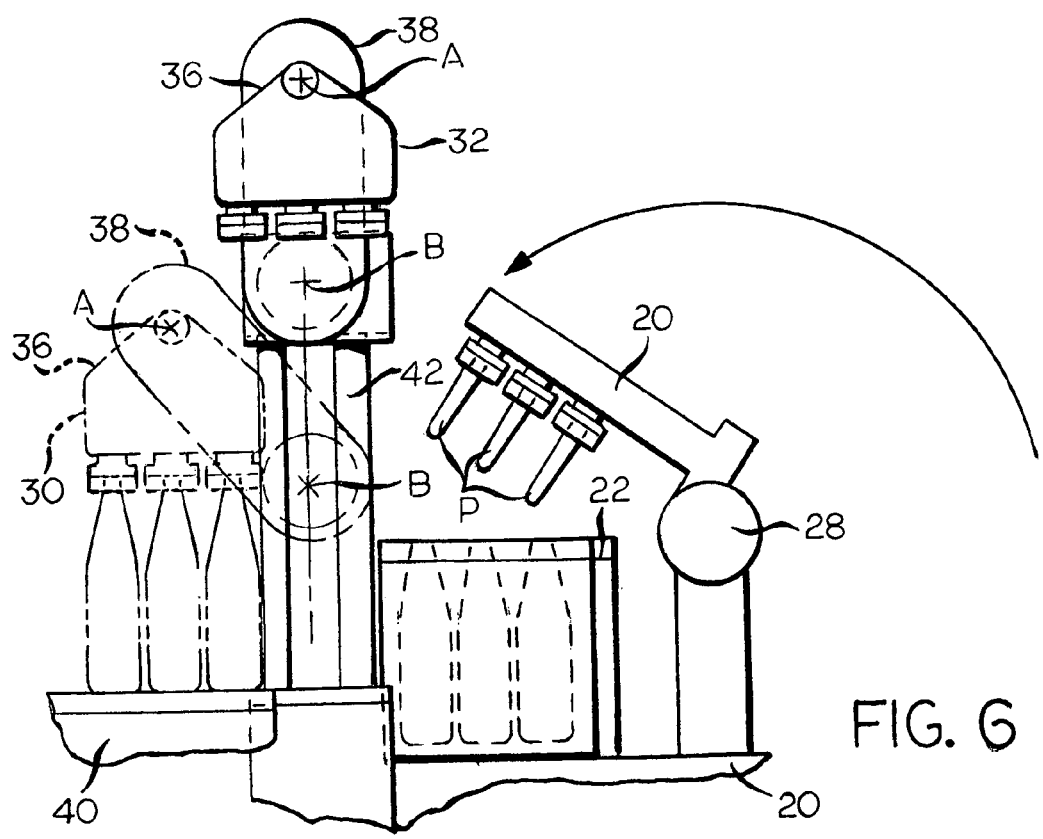

The parisons P to be formed into the containers C in the mold set 22 are transferred thereto from a blank molding side of the machine section by neck molds 24, as shown specifically in FIG. 5. The neck molds 24 are carried by an invert or neck mold arm assembly 26 that is connected to an oscillatable invert or neck mold shaft 28, often referred to as a rock shaft, that oscillates in a 180° arc between the position shown on FIG. 1 and the position shown in FIG. 5. Upon the transfer of the parisons P to the mold set 22, the invert arm assembly 26, with the neck molds 24 carried thereby, reverts from the FIG. 1 position to the FIG. 5 position to begin a repeat of the glass container manufacturing process in the mold set 22, following the removal of the previous blown containers C therefrom.

The I.S. machine section 20 is provided with a side-by-side pair of combined blowhead/takeout mechanisms 30, 32, each of which carries a plurality of individual blowheads 34, one such blowhead 34 for each container C being formed in the mold set 22. The blowhead mechanism 30 is shown in detail in FIGS. 7–13 at the position shown in FIG. 6, but it is to be understood that the blowhead 32 is of the same construction as the blowhead 30. In any case, each of the blowhead mechanisms 30, 32 is made up of a carrier arm 36, from which the blowheads 34 are suspended, and an oscillating arm 38, from which the carrier arm 36 is suspended for pivoting motion from the oscillating arm 38 about an axis A. Each carrier arm 36 is pivoted from the oscillating arm 38 of the blow head mechanism 30 or 32 of which it is an element by a parallel linkage or other equivalent structure in a known manner, to ensure that it does not change the angular position of the blowheads 34 that are carried by the carrier arm 36 as the oscillating arm 38 oscillates, for example, from the position of the blowhead mechanism 30 in FIG. 1 to its position in FIG. 6.

Figure 1:
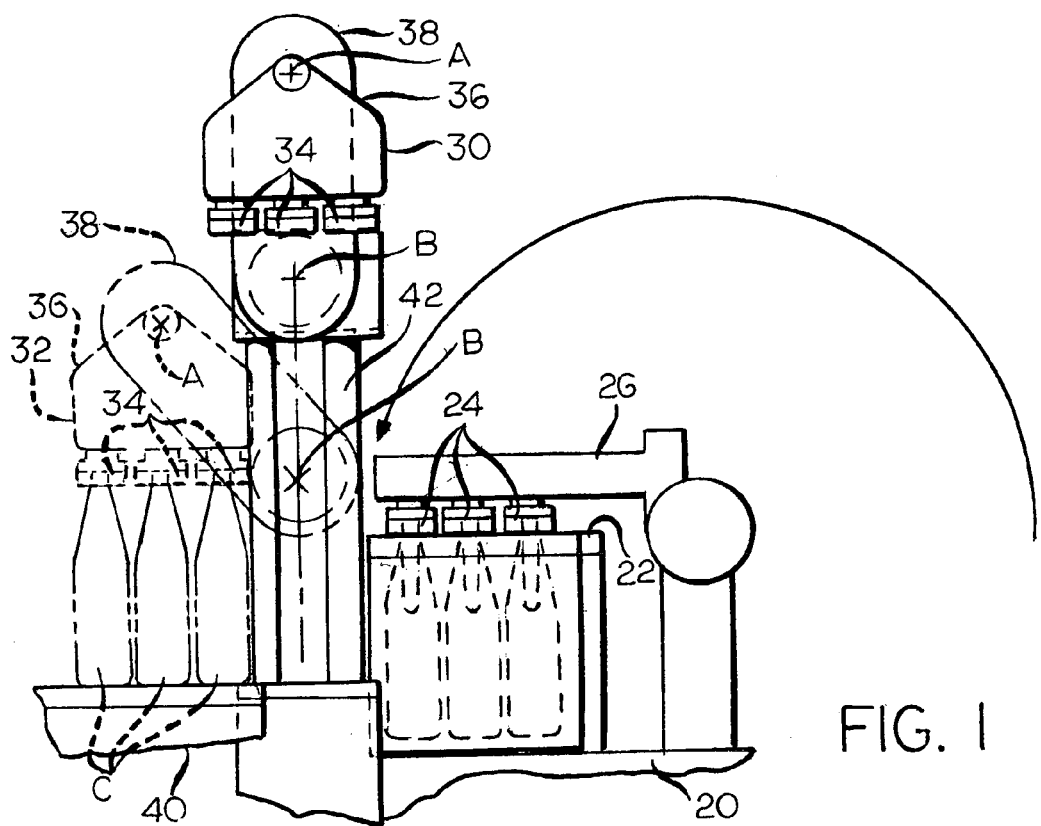
FIGS. 1–6 are schematic elevational views showing apparatus according to the present invention at different positions during the operating cycle of such apparatus.
Figure 2:
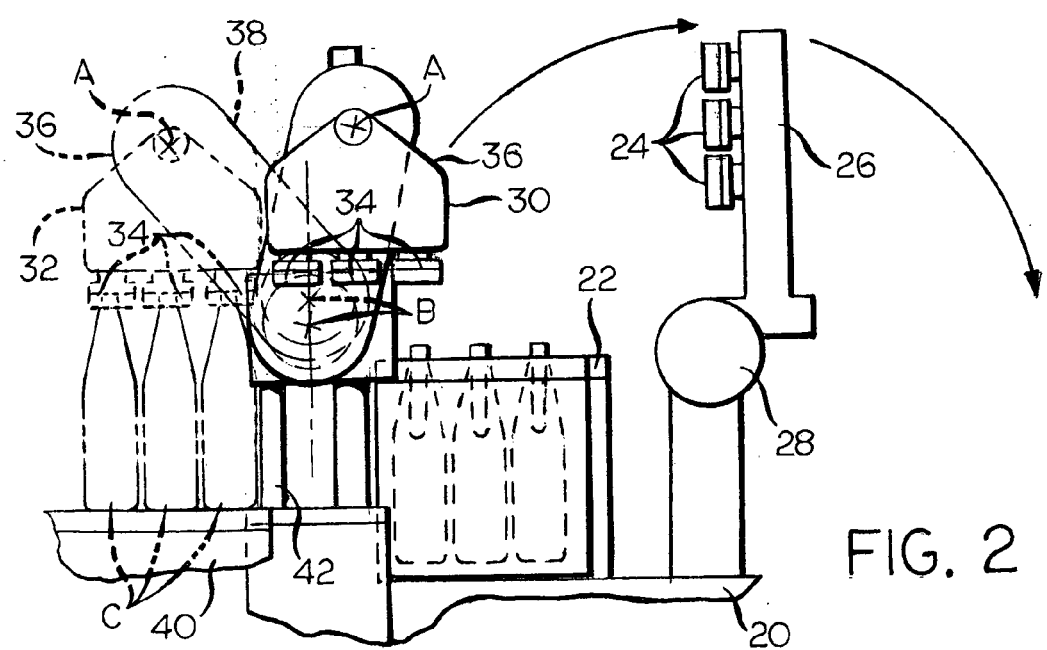

FIG. 1 depicts the position of the blowhead mechanism 32 immediately above a deadplate 40 of the I.S. machine section 20 to be able to deposit blown containers C thereon. In this condition of the apparatus, the blowhead mechanism 30 is positioned in vertical alignment with a tower 42 to which the blowhead mechanism 30 is secured for pivoting motion about an axis B. Likewise, the blowhead mechanism 32 is secured for pivoting motion about an axis B to a second tower (not shown), which is immediately behind and a mirror image of the tower 42. In that regard the pivot axis B for each of the blowhead mechanisms 30, 32 is vertically moveable, by structure that will be hereinafter described in greater detail, between a lower position, for example, that of the blowhead mechanism 32 in FIG. 1, to the higher position of the blowhead mechanism 32 in FIG. 4, to permit the blowhead mechanisms 30, 32 to oscillate between the positions shown in FIG. 1 and the positions shown in FIG. 4 without interfering contact between the blowhead mechanisms 30, 32, which are aligned in the same vertical plane. In this manner, the blowheads 34 of the blowhead mechanism 32 will be positioned to immediately engage parisons P in the molds 22 while the blowhead mechanism 30 is enroute to deposit containers C on the deadplate 40, as can be seen from a comparison, for example, of FIGS. 4 and 6. This permits a substantial calculated reduction in cycle time between the removal of the set of containers C from the mold set 22 and the removal of the next set of containers C from the mold set 22, compared to an installation using only a single blowhead/takeout mechanism, of approximately 13%, and it does so without reducing the time available for the cooling of the containers C on the deadplate 40 before it is necessary to remove partly-cooled containers C from the deadplate 40 to accommodate the transfer of freshly formed containers C to the deadplate 40. Alternatively, cycle improvement can be somewhat reduced by moving the blowheads 30, 32 more slowly to reduce inertial forces on the blown containers C. In any case, the reduction in cycle time can be enhanced by approximately 4%, that is, to a total of approximately 17%, if each pair of combined blowheads/ takeout mechanisms is adapted to engage blown containers C by finishes before the split molds of the mold set 22 are separated, without the need to delay the engagement of containers C until the split molds are open, which is required when transferring blown containers from the mold set 22 by engagement of a transfer bead by tongs of a conventional takeout mechanism. This phenomenon is described in the aforesaid '488 B1 patent. Further, the use of blowheads to transfer blown containers C to the deadplate 40 permits partial cooling of the containers C by blowing air going to the blowhead 30 or 32 during the transfer step.

Figure 7:
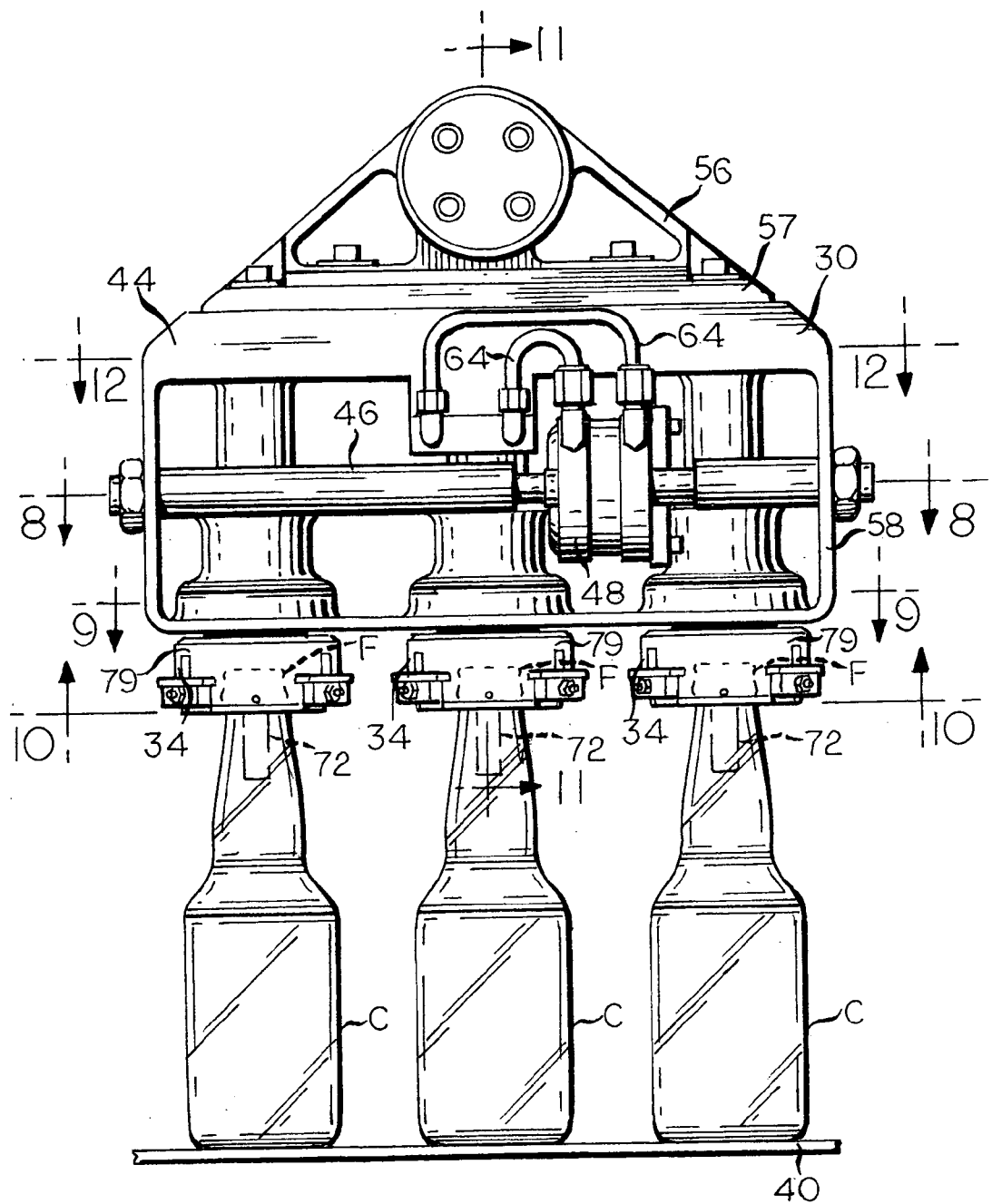
FIG. 7 is an elevation view at an enlarged scale, of a portion of the apparatus of FIGS. 1–6.
Figure 8:
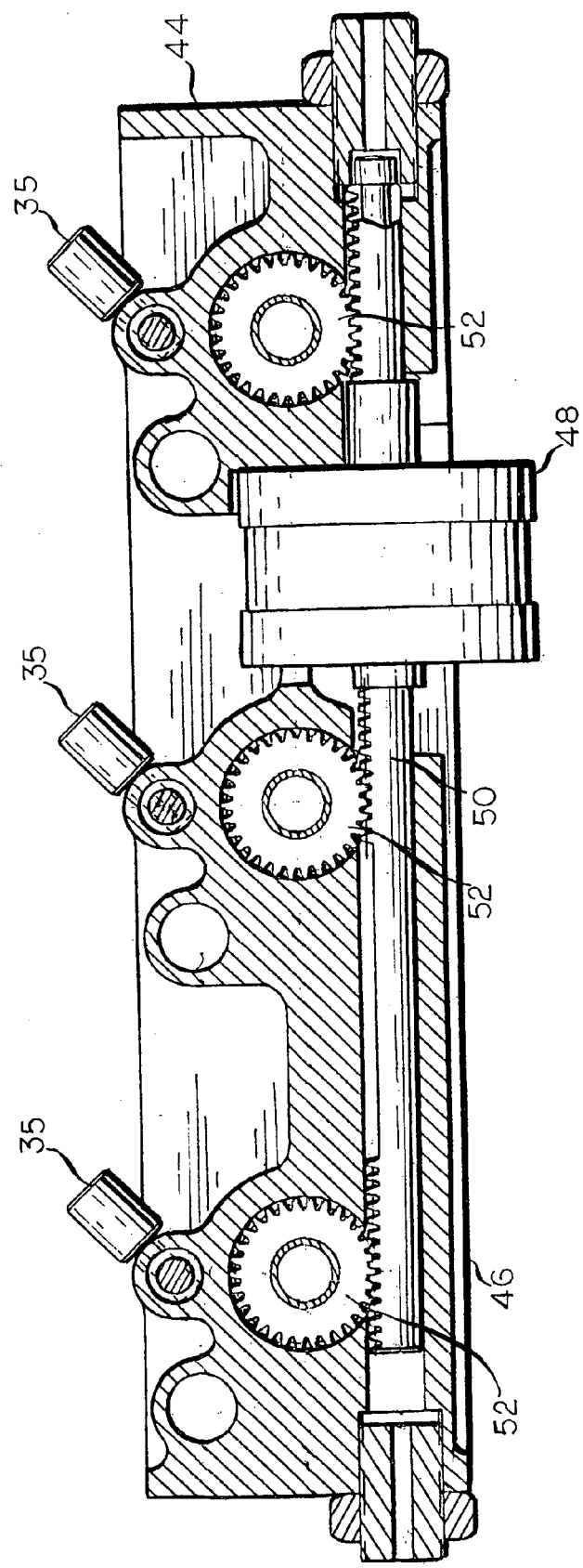
FIG. 8 is a sectional view taken on line 8—8 of FIG. 7.
Figure 9:
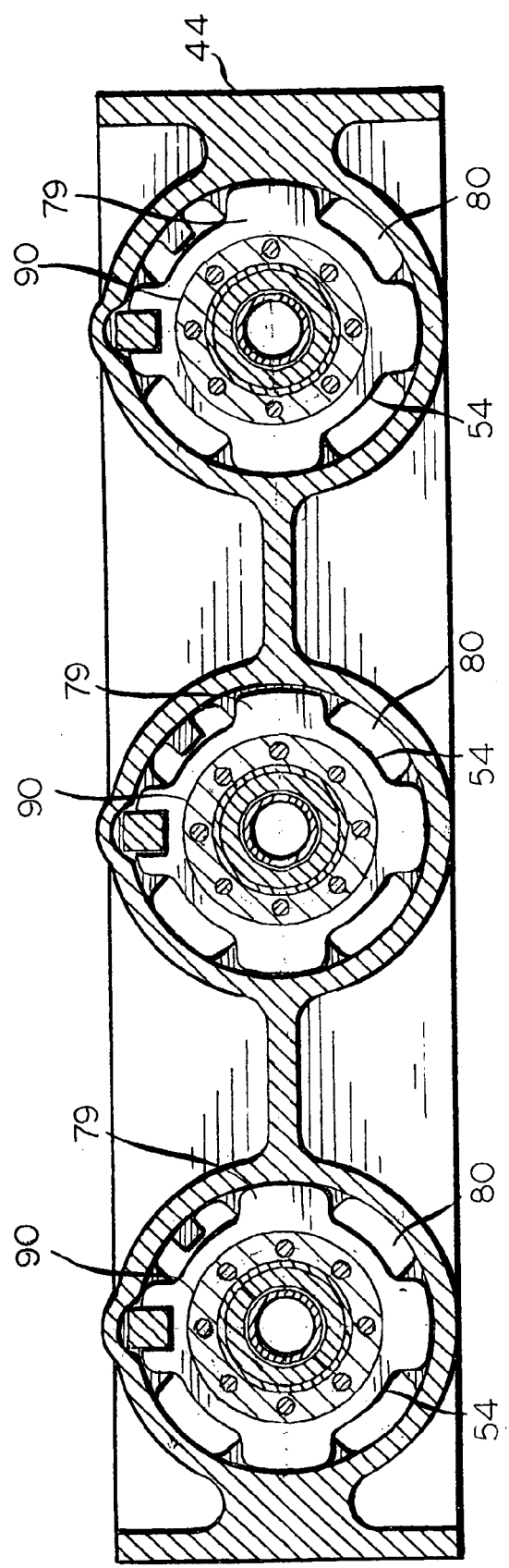
FIG. 9 is a sectional view taken on line 9—9 of FIG. 7.
Figure 10:
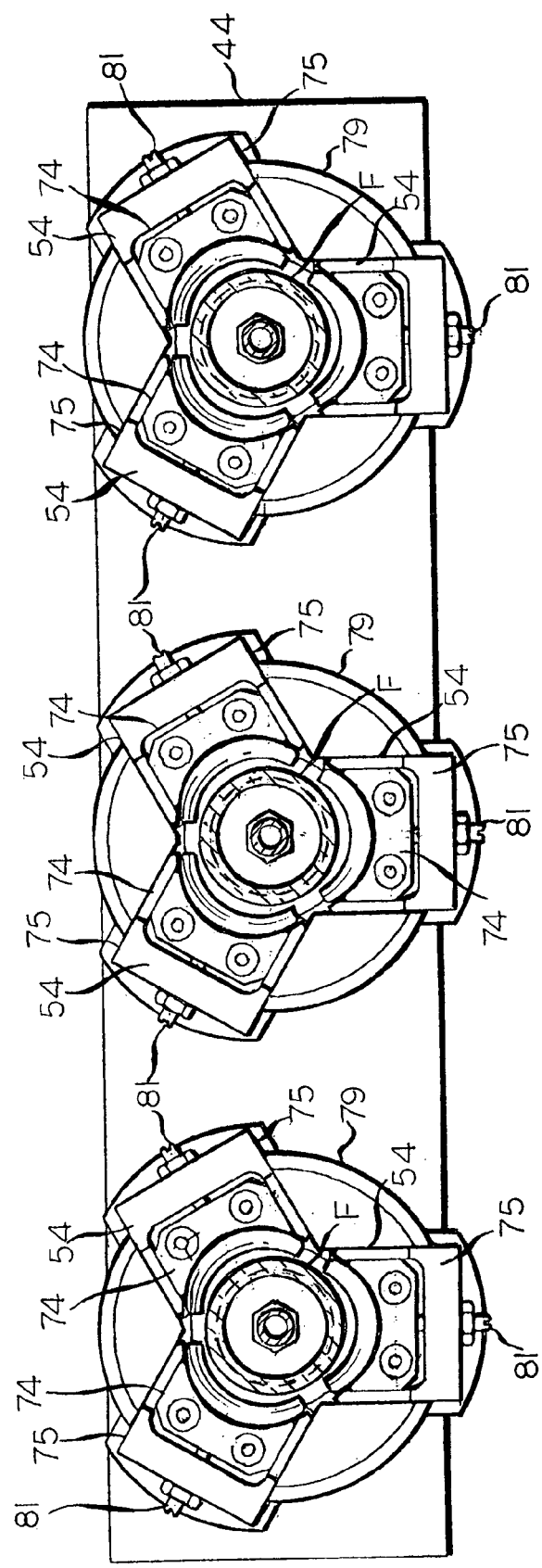
FIG. 10 is a sectional view taken on line 10—10 of FIG. 7.
Figure 11A:
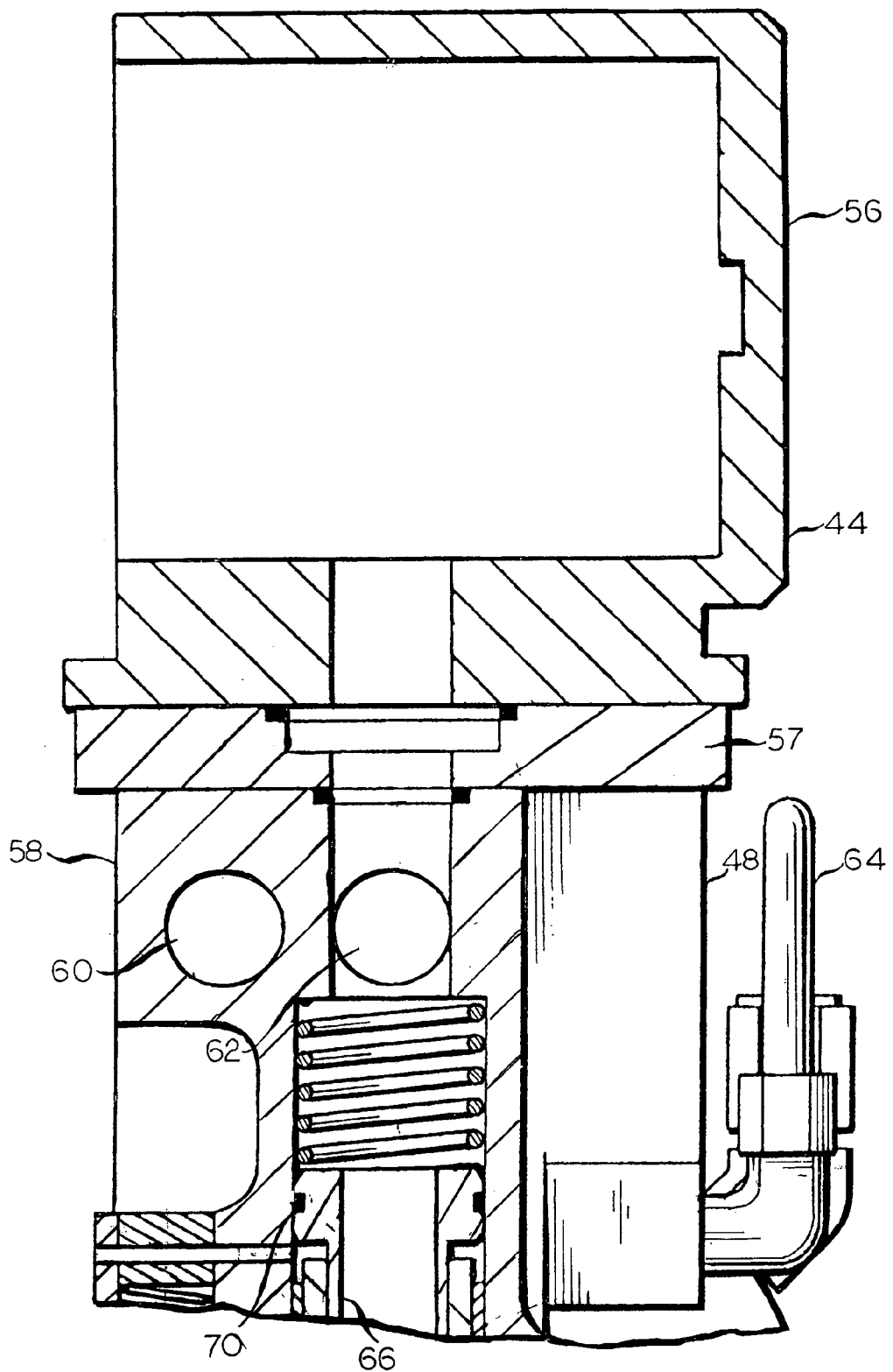
FIGS. 11A, 11B, collectively, constitute upper and lower views, respectively, and at an enlarged scale, taken on line 11—11 of FIG. 7.
Figure 11B:
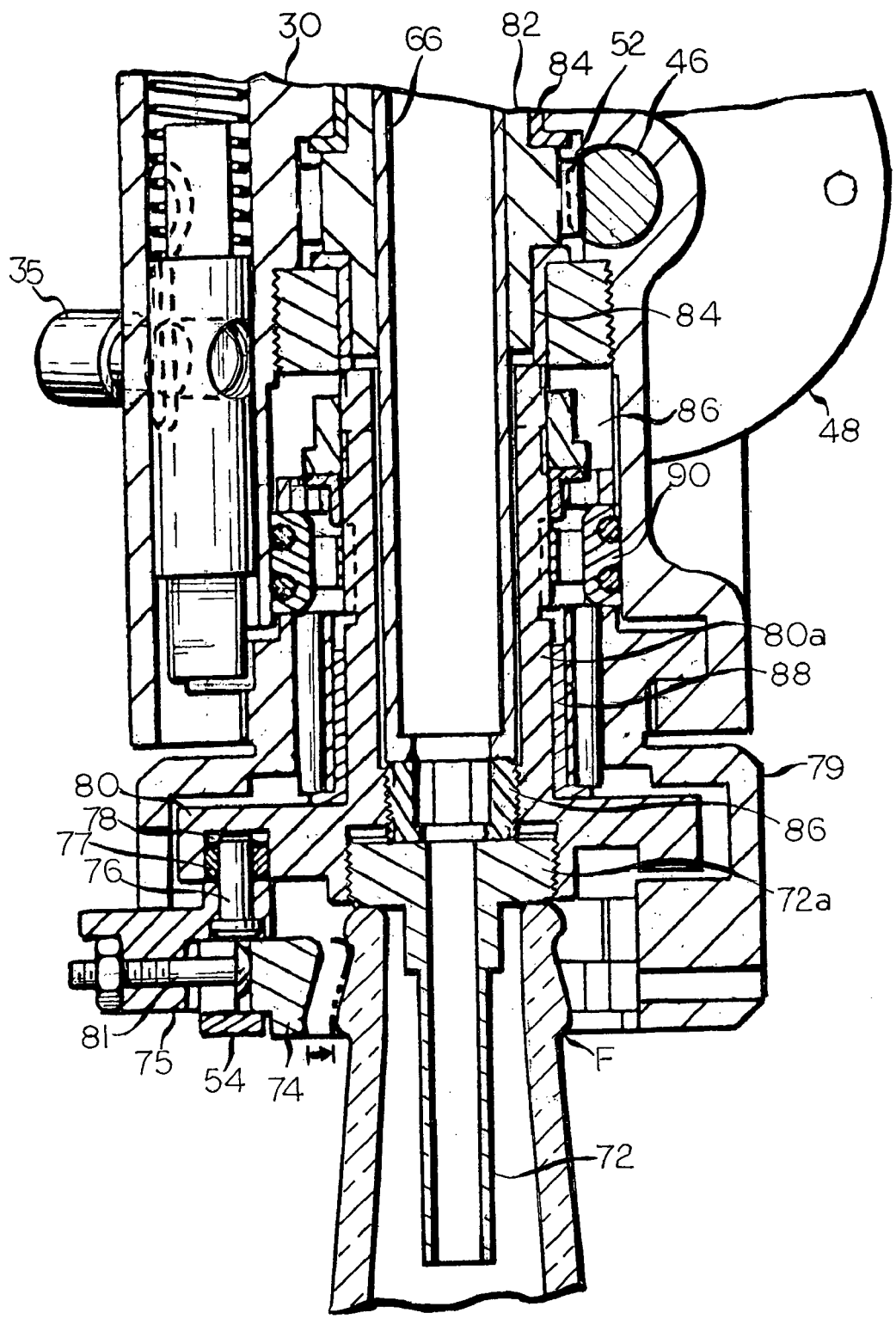

As shown in FIG. 7, the blowhead mechanism 30 has a generally trapezoidial-shaped frame 44 that carries the blowheads 34, each of which is quickly disengageable from the frame 44 by way of a disconnect 35 (FIG. 11B). The frame 44 is provided with a split annular member 46 that extends therethrough, above and parallel to the orientation of the containers C that are carried by the blowhead 30. A reversing, double acting pneumatic cylinder 48 is positioned between the ends of the annular member 46, and the cylinder 48 drives a split rack 50 (FIG. 8) that extends from opposed ends through the annular member 46. The split rack 50, which reciprocates but does not rotate, engages, in a right-angle drive, a screw 52 associated with each of the blowheads 34 to simultaneously open or close a container finish-engaging tong or chuck assembly 54 (FIGS. 9, 10) that is associated with each of the blowheads 34.

Figure 3:
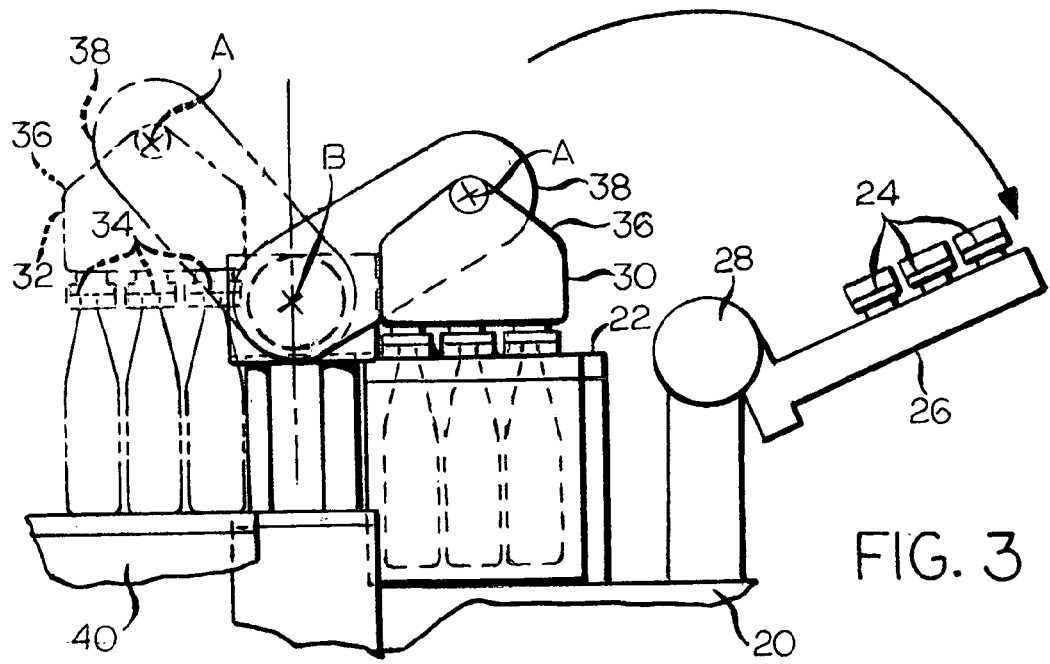
Figure 4:
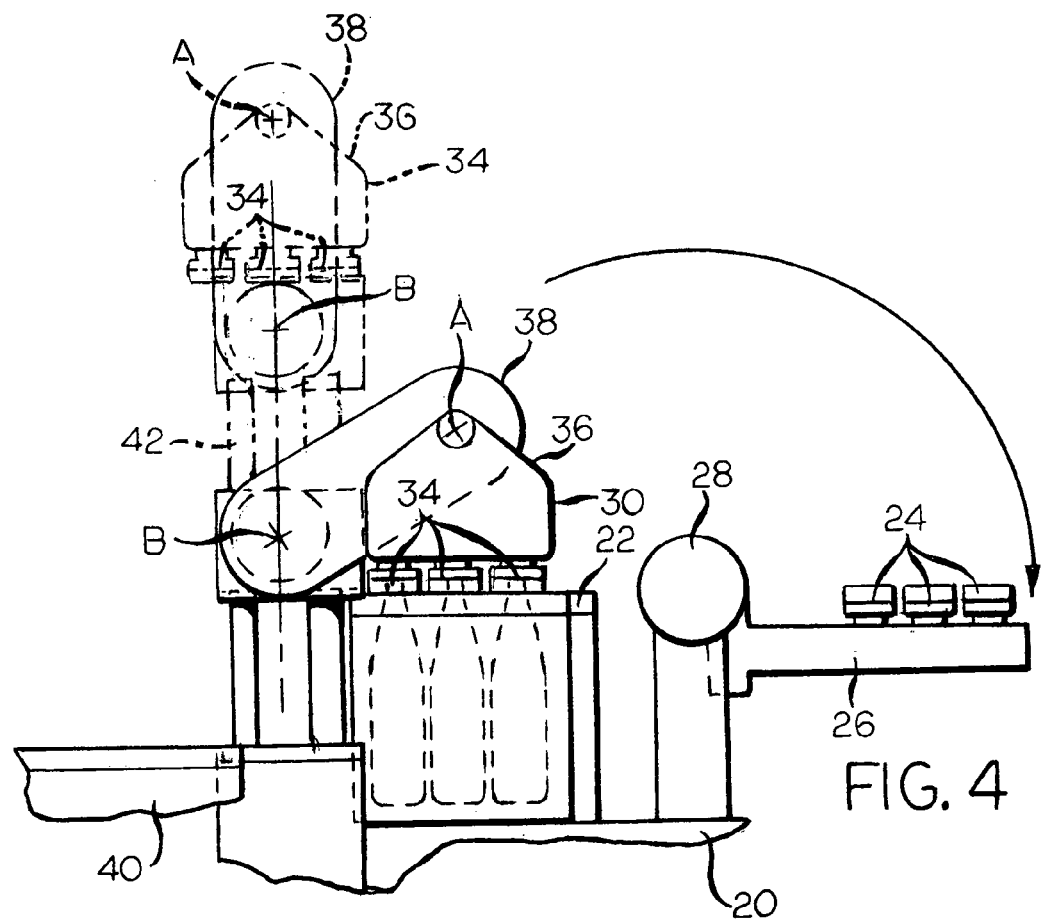
Figure 12:
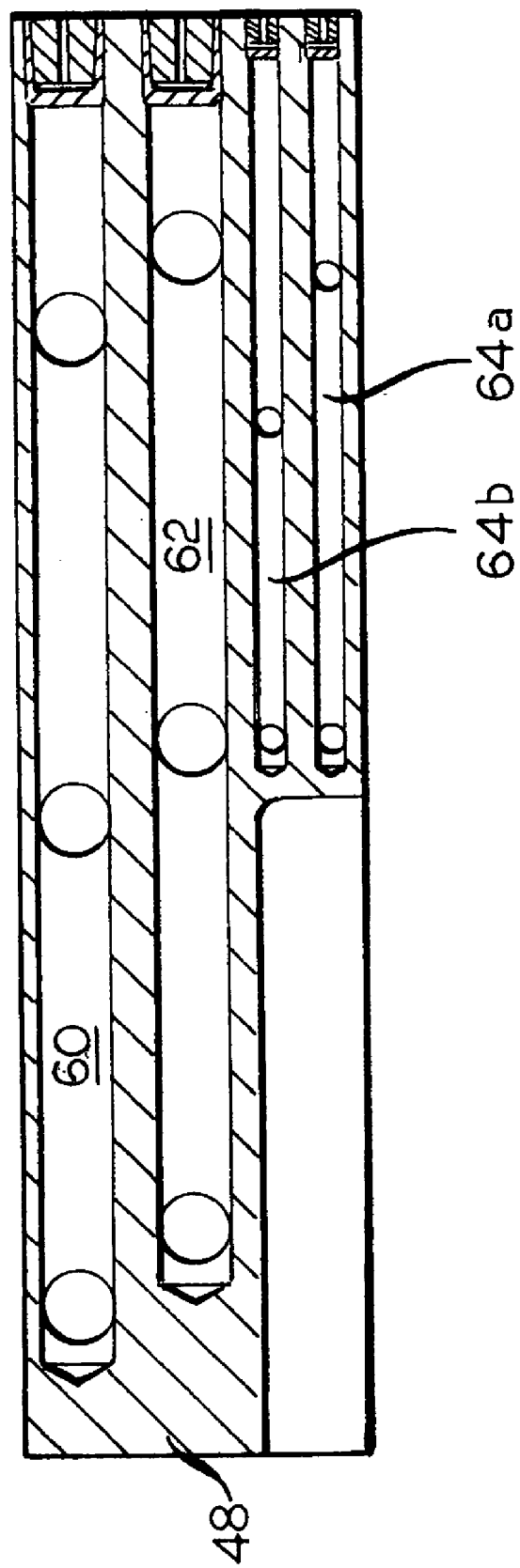
FIG. 12 is a sectional view taken on line 12—12 of FIG. 7.
Figure 13:
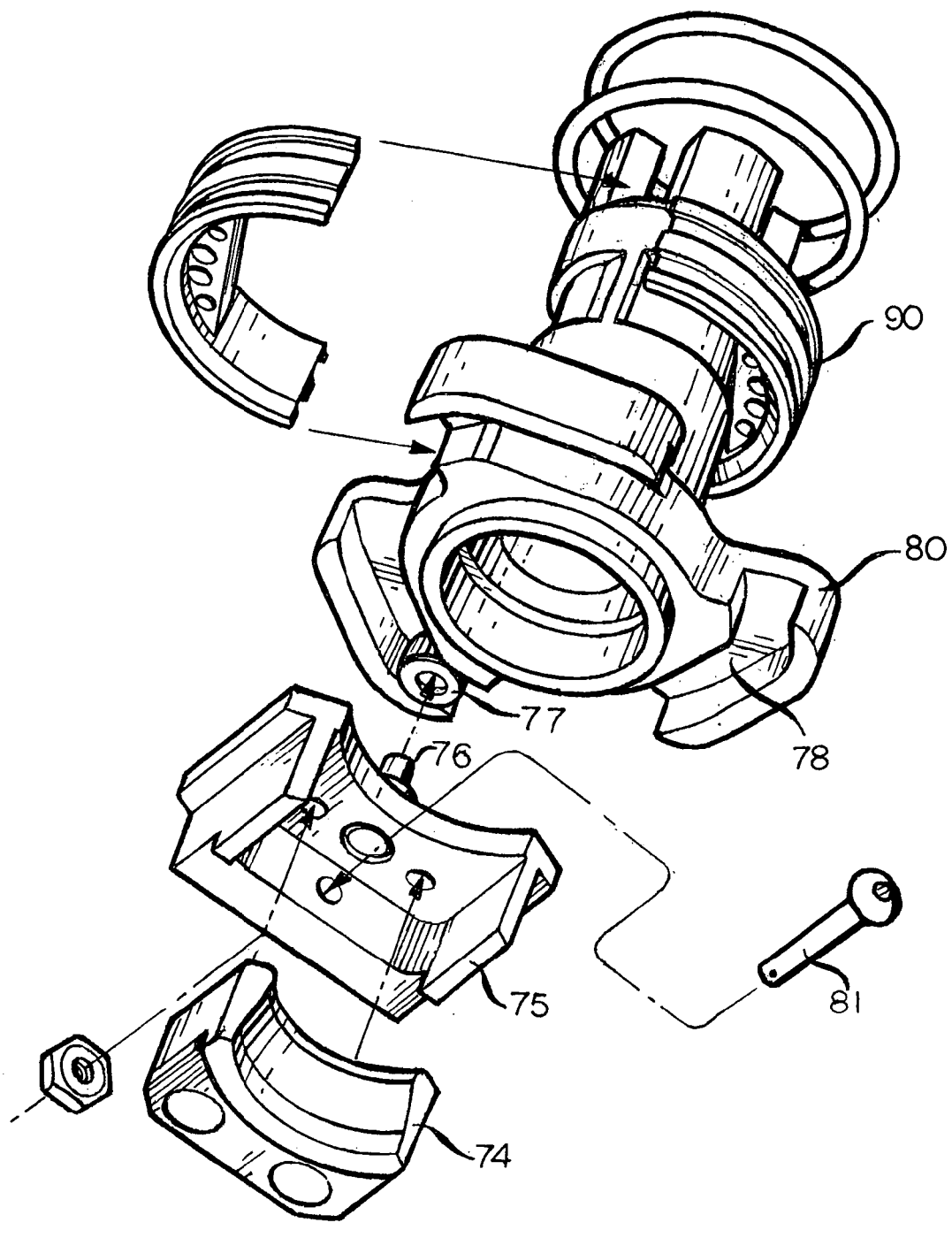
FIG. 13 is an exploded, perspective view of a portion of the apparatus of FIGS. 7–12.

As shown in FIGS. 7, 11A, the frame 44 is made up of a generally triangularly-shaped upper member 56 bolted or otherwise adjustably secured to a lower member 58 with an alignment plate 57 positioned therebetween to ensure proper alignment between the upper member 56 and the lower member 58, which have aligned openings therein. The upper member 56 is affixed to the oscillating arm 38 for oscillation with the oscillating arm 38 between the position shown in FIGS. 3 and 4 and the position shown in FIG. 6, and the lower member 58 carries the elements associated with each of the blowheads 34. As shown in FIG. 12, cooling air for the cooling of each of the blowheads 34 is circulated through a passage 60 in the lower member 58, and blow air for blowing parisons P into containers C, in the position of the blowhead mechanism 30 shown in FIGS. 3, 4, is introduced through a passage 62 in the lower member 58. The air for the operation of the cylinder 48, which is shown as a pair of like cylinders disposed tail end to tail end, is introduced through inlet lines 64, which receive air from passages 64a, 64b in the lower member 58. Blowing air from the passage 62 blows downwardly into a parison F that is being blown into a container C through a transfer tube 66, an upper end which is resiliently biased downwardly by a compression spring 68, an O-ring 70 being provided to permit sealed, sliding motion between an enlarged upper end of the transfer tube 66 and a passage in the lower member 58 in which the upper end of the transfer tube 66 is positioned. A lower end of the transfer tube 66 seats against and discharges into an upper end of a blow air inlet tube 72 (FIG. 11B) that extends into a parison P or a container C, as the case may be, that is engaged by the blowhead 34 with which the air inlet tube 72 is associated.

Each tong assembly 54 carries a circumferentially-spaced plurality, shown as three, tong elements 74 that simultaneously are powered to move radially either inwardly to grasp a finish F (FIG. 11B) of a container C or outwardly to release the finish F of the container C. While the container C is shown as having a finish F for the application of a crown closure to the container C, it is also contemplated that the finish F engaging surface of the tong elements 74 may be configured to handle containers C with threaded finishes F. In that regard, each of the tong elements 74 is retained within a tong holder 75 and has an upperwardly extending pin 76 that is received in an annular cam follower 77, which rides in a noncircular slot 78 of a lobe of an oscillating cam 80. Oscillation of the cam 80, by the extension and retraction of the split rack 50, is effective to simultaneously move the tong elements 74 of each of tong assembly 54 into or out of engagement with a finish (F) of a container (C). The assembly that includes the tong elements 74 and the tong body 76 is slideable within an annular tong housing 79, and rearward travel of such assembly is limited by a pin 81, whose position along its longitudinal central axis is adjustable.

The screw 52 of each blowhead 34 is secured to an annular member 82 that surrounds the transfer tube 66, bushings 84 being provided within a recess 86 in the blowhead mechanism 30 at opposed ends of the transfer tube 82 to permit it to oscillate, with the screw 52 and the transfer tube 66, around the longitudinal central axis of the transfer tube 66. A lowermost end of the transfer tube 66 is provided with an externally threaded plug 86, and the cam 80, which has an upstanding annular portion 80a that is rotatable in a bushing 88, is threadably secured to an exterior of the plug 86 to be rotatable therewith. The cam 80 is also threadably secured to an extension of an upper portion 72a of the air inlet tube 72 to be rotatable therewith; thus, reciprocation of the split rack 50 is effective to oscillate the screw 52, and, thereby, to oscillate the cam 80 to move the tong elements 74 inwardly and outwardly, as desired. However, an annular brake assembly 90 is provided surrounding a portion of upstanding portion 80a of the cam 80 to prevent oscillating motion of the cam 80 when desired.

Figure 14:
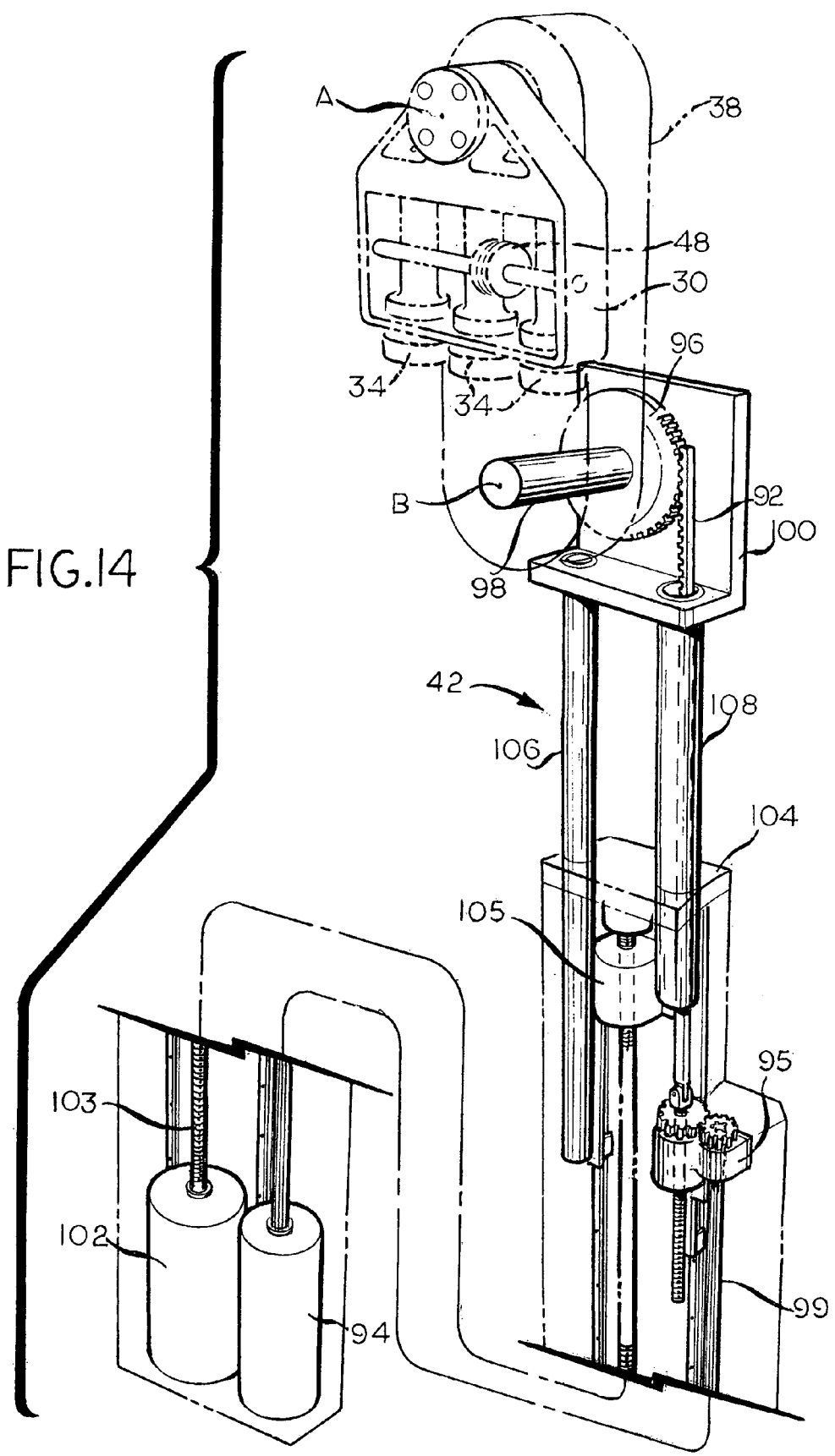
FIG. 14 is an exploded, perspective view at an enlarged scale, of another portion of the apparatus of FIGS. 1–6.

FIG. 14 illustrates apparatus, which has previously been identified as the lower A2, for raising and lowering the axis of the blowhead mechanisms 30, 32. FIG. 14 illustrates such apparatus specifically in reference to the blowhead mechanism 30, and the tower 42 to which it is pivotably secured, but it is to be understood that apparatus for raising and lowering the blowhead mechanism 32 is the same in design and construction as that for the blowhead mechanism 30. The oscillation of the arm 38 about the axis B is powered by a rack 92, whose rectilinear motion is powered by a reversible motor 94, preferably an a.c. servo motor for optimum controllability. Oscillation of the motor 94 results in oscillation of a gear assembly 95, which slides upwardly and downwardly on a ball spline 99 that extends to the gear assembly 95 from the motor 94. The rack 92 drives a spur gear 96 that is affixed to a shaft 98, through which the axis B extends and to which the arm 38 is connected for turning with the shaft 98.

The shaft 98 is rotatably mounted in a bracket 100, and the elevation of the bracket 100, and thereby that of the shaft 98 and the oscillating arm 38, is adjustable based on a rotary motor 102, preferably an a.c. servo motor, which engages a screw 103 that elevates or lowers a bracket 104 from which the bracket 100 is supported by vertical support 106, 108, the support 108 being annular and surrounding a lowermost portion of the rack 92. Thus, the oscillation of the shaft 98, and thereby of the oscillating arm 38, is powered by the motor 94, independently of the raising and lowering of the shaft 98, and thereby the oscillating arm 38, which is powered by the motor 102, subject to an electronic or other control system, which may be of conventional construction, that is used to control the operation of the motor 94 and the motor 102 in a timed sequence relative to one another.

Although the best mode contemplated by the inventors for carrying out the present invention as of the filing date hereof has been shown and described herein, it will be apparent to those skilled in the art that suitable modifications, variations, and equivalents may be made without departing from the scope of the invention, such scope being limited solely by the terms of the following claims and the legal equivalents thereof.

What is claimed is:

1. The process for blowing glass containers in a mold of a glass container forming machine and for transporting blown containers from the mold to a deadplate of the glass container forming machine, the process comprising:

providing a first combined takeout and blowhead mechanism;

injecting air into a first group of containers through the first combined takeout and blowhead mechanism while the containers are in the mold to blow preforms of the containers into containers;

grasping the first group of blown containers by the first combined takeout and blowhead mechanism;

transferring the first group of blown glass containers grasped by the first combined takeout and blowhead mechanism to a deadplate and releasing the first group of blown glass containers at the deadplate;

providing a second combined takeout and blowhead mechanism;

injecting air into a second group of glass containers being blown in the molds of the forming machine through the second combined takeout and blowhead mechanism while the containers are in the mold to blow preforms of the containers into containers;

grasping the second group of blown glass containers by the second combined takeout and blowhead mechanism; and transferring the second combined takeout and blowhead mechanism from the mold to the deadplate while transferring the first combined takeout and blowhead mechanism from the deadplate to the mold without contact between the first combined takeout and blowhead mechanism and the second combined takeout and blowhead mechanism.

2. The method according to claim 1 and further comprising:

reversibly elevating each of the first combined takeout and blowhead mechanism and the second combined takeout and blowhead mechanism while the other of the first combined takeout and blowhead mechanism is transferring containers to the deadplate.

3. The method according to claim 1 and further comprising:

continuing to inject air into the containers being transferred by the first combined takeout and blowhead mechanism while the containers are being transferred to the deadplate; and continuing to inject air into the containers being transferred by the second combined blowhead and takeout mechanism while the containers are being transferred to the deadplate.

* * * * *